United States Patent [19]

Bell

[11] Patent Number: 5,410,707

[45] Date of Patent: Apr. 25, 1995

[54] BOOTSTRAP LOADING FROM EXTERNAL MEMORY INCLUDING DISABLING A RESET FROM A KEYBOARD CONTROLLER WHILE AN OPERATING SYSTEM LOAD SIGNAL IS ACTIVE

[75] Inventor: D. Michael Bell, Beaverton, Oreg.

[73] Assignee: Intel Corporation, Santa Clara, Calif.

[21] Appl. No.: 204,820

[22] Filed: Mar. 1, 1994

Related U.S. Application Data

[63] Continuation of Ser. No. 692,573, Apr. 29, 1991, abandoned.

[51] Int. Cl.[6] .............................................. G06F 9/445
[52] U.S. Cl. ..................................... 395/700; 395/425;
364/DIG. 1; 364/280; 364/280.2
[58] Field of Search ................................ 395/700, 425

[56] References Cited

U.S. PATENT DOCUMENTS

| | | | |
|---|---|---|---|
| 4,456,972 | 6/1984 | Lee et al. ..................... | 364/DIG. 2 |
| 4,498,151 | 2/1985 | Henry ............................ | 364/DIG. 2 |
| 4,679,166 | 7/1987 | Berger et al. ................... | 395/650 |
| 4,720,812 | 1/1988 | Kao et al. ....................... | 395/700 |
| 4,802,119 | 1/1989 | Heene et al. .................... | 395/400 |
| 4,943,911 | 7/1990 | Kopp et al. ..................... | 395/375 |
| 5,012,514 | 4/1991 | Renton ............................ | 380/4 |
| 5,086,503 | 2/1992 | Chung et al. ................... | 395/700 |
| 5,155,833 | 10/1992 | Cullison et al. ................ | 395/425 |

*Primary Examiner*—Paul V. Kulik
*Attorney, Agent, or Firm*—Blakely, Sokoloff Taylor & Zafman

[57] ABSTRACT

A computer system bootstrap loads a processor and associated memory from an external memory device instead of being bootstrap loaded from on-board read only memory. The computer system is comprised of a system bus, a processing component, a first system memory device, a memory card interface controller, and an external memory device connected to the memory card interface controller. The system also includes a second system memory device, a keyboard memory device, a keyboard controller and a reset switch for causing a reset and initialization of the processing component. Upon reset, the logic in the memory card interface controller remaps the address space associated with the first system memory device to the external memory device and remaps the address space associated with the second system memory device to the keyboard memory device. This remapping redirects execution control of the processing component to the external memory device and allows the keyboard memory device to be loaded and verified by the processing component. The keyboard controller is held in a reset state. Once the keyboard memory device and local random access memory has been loaded from the external memory device, the address space remapping of the first and second memory devices is restored to a normal configuration. The contents of the first and second memory devices can then be loaded and verified. The reset condition is then removed from the keyboard controller and normal operation of the computer system is restored.

17 Claims, 3 Drawing Sheets

BOOTSTRAP LOADING FROM EXTERNAL MEMORY INCLUDING DISABLING A RESET FROM A KEYBOARD CONTROLLER WHILE AN OPERATING SYSTEM LOAD SIGNAL IS ACTIVE

This is a continuation of application Ser. No. 07/692,573, filed Apr. 29, 1991, now abandoned.

FIELD OF THE INVENTION

The present invention relates to the field of computer systems. Specifically, the present invention relates to the field of bootstrap loading or bootstrapping computer systems.

BACKGROUND OF THE INVENTION

Many prior art computer systems are configured at a minimum typically with a processor, a random access memory device, and a read only memory device. Some systems, such as a variety of calculators, may operate with only a processor and a read only memory device. Read only memory devices (ROM) and some forms of random access memory devices provide a non-volatile form of memory that is not destroyed when power is removed from the computer system.

Prior art computer systems are typically bootstrapped (i.e. power up initialized) using the processing logic (i.e. firmware) stored within the read only memory device internal to the computer system. Since the read only memory device is non-volatile, the firmware within ROM is guaranteed to contain valid data or instructions; thus, the prior art computer system can be reliably bootstrapped using firmware within ROM. Upon execution of the firmware within ROM at computer system power up, bootstrap firmware logic typically initiates a series of diagnostic tests to determine the operational status of computer system resources. One of these diagnostic tests is typically run on the available random access memory. Since typical prior art computer systems have a volatile form of random access memory, for example dynamic random access memory (DRAM), the initial content of random access memory at computer system power up is uninitialized and useless. In order to validate the operational integrity of random access memory, firmware processing logic typically exercises random access memory by executing a series of data write instructions followed by data read instructions in order to determine if the random access memory device is able to retain data. Once the random access memory diagnostic tests are completed, ROM bootstrap firmware performs the task of loading random access memory with an operating program. Typically, the operating program is read by firmware from a disk or tape data storage device and transferred to a predetermined location in random access memory. Once the loading of random access memory is completed, the bootstrap process is completed by the transfer of execution control to a starting position within the operating program now stored in random access memory. In this way, an internal ROM is used to initially bootstrap the prior an computer system.

Some form of internal read only memory is often used in prior art computer systems for other purposes in addition to bootstrapping. For example, read only memory is used for storing an identity code that uniquely identifies the computer system. In other systems, configuration data is stored in read only memory in order to retain a particular preset user configuration or a set of constant system parameters. Thus, for a variety of reasons, prior art computer systems include some form of read only memory.

There are several problems associated with using internal read only memory for bootstrapping or configuring a computer system. The read only memory used in prior art computer systems is typically comprised of one of a variety of available devices (i.e. ROM, PROM, EPROM, EEPROM) in the form of an integrated circuit chip. In order to modify or upgrade the firmware contained in ROM, the ROM chip must be physically removed from a circuit board internal to the computer system. Another ROM chip containing the upgraded or modified firmware is then inserted into a socket or soldered into a circuit board of the computer system. This process of upgrading firmware is time consuming, expensive, and likely to introduce other problems as a circuit board is handled in the ROM replacement process. Additionally, configuration control problems are introduced when ROM firmware is used. Since firmware in particular computer systems may be slightly different, a high level of configuration control is necessary in the manufacturing, distribution, and field service of computer system products. Mass production and servicing of computer systems becomes more difficult when individual units are not uniformly configured.

A better means and method is needed for bootstrapping a computer system.

SUMMARY OF THE INVENTION

The present invention is a computer system wherein a processor is bootstrap loaded from an external memory device instead of being bootstrap loaded from onboard internal read only memory. The computer system is comprised of a system bus, a processing component, a first system memory device, a memory card interface controller, and an external memory device connected to the memory card interface controller. In the preferred embodiment, the first system memory device and the external memory device are flash memory devices. The preferred embodiment of the present invention also provides a second system memory device, a keyboard memory device and a keyboard controller. In the preferred embodiment, the second system memory device and the keyboard memory device are also flash memory devices. The system also provides a reset switch for causing a reset and initialization of the processing component.

Upon reset, the logic in the memory card interface controller generates a signal for other components of the computer system during bootstrap loading that directs those other computer system components to perform special bootstrap loading operations. These operations include the remapping of the address space associated with the first system memory device to the external memory device. In this manner, execution control of the processing component is directed to the external memory device on a reset. A local random access memory device coupled to the processing component may then be loaded from the external memory device. Another remapping operation is performed during bootstrap loading whereby the address space associated with the second system memory device is remapped to the keyboard memory device. This remapping allows the keyboard memory device to be loaded and verified by the processing component. Also during the bootstrapping operation, a signal is generated to hold the keyboard controller in a reset state thereby preventing the keyboard controller From allowing a manual reset of the computer system while the bootstrap loading operation is in progress. Once the keyboard memory device and local random access memory has been loaded from the external memory device, the address space remapping of the first and second memory devices is restored to a normal configuration. The contents of the first and second memory devices can then be loaded and verified. Having completed the bootstrap loading process, the reset condition is removed from the keyboard controller and normal operation of the computer system is restored.

It is therefore and object of the present invention to provide a means for bootstrapping a computer system without the use of on-board read only memory. It is a further object of the present invention to provide a computer system for which an operating system program may be updated without physically removing any on-board memory. It is a further object of the present invention to provide a computer system that does not require any valid memory contents on initial system power up. It is a further object of the present invention to provide a computer system wherein a processor is bootstrap loaded from an external memory device. It is a further object of the present invention to provide a computer system for which field upgrades of operating software is more efficient and less expensive.

These and other objects of the present invention will become apparent as presented and described in the following detailed description of the preferred embodiment.

DETAILED DESCRIPTION OF THE PREFERRED EMBODIMENT

The present invention is a computer system wherein a processor is bootstrap loaded from an external memory device instead of being bootstrap loaded from on-board read only memory. In the following description, numerous specific details are set forth in order to provide a thorough understanding of the invention. However, it will be apparent to one of ordinary skill in the art that these specific details need not be used to practice the present invention. In other instances, well known structures, circuits, and interfaces have not been shown in detail in order not to unnecessarily obscure he present invention.

Figure 1:
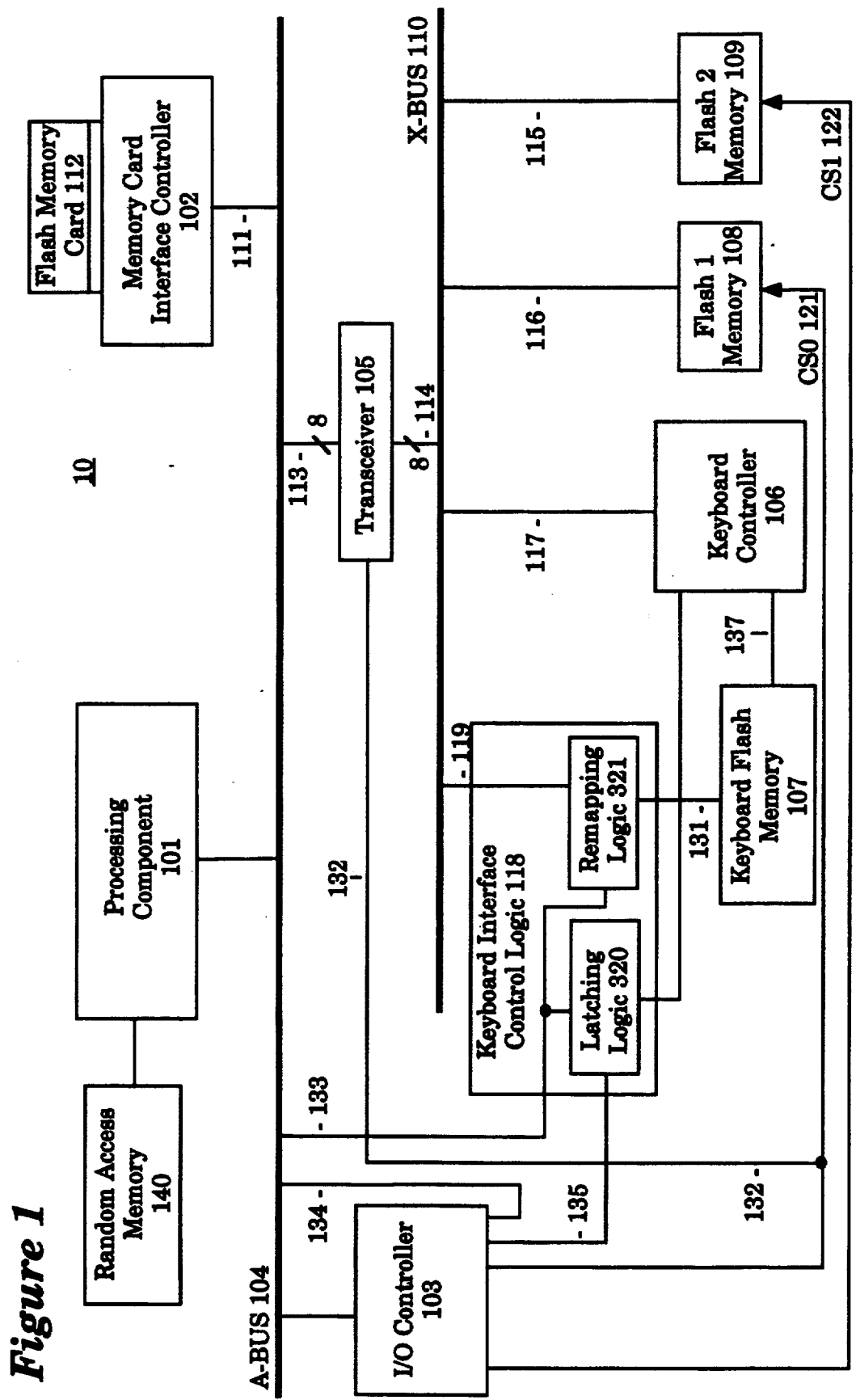
FIG. 1 is an illustration of the computer system of the present invention.

Referring to FIG. 1, a block diagram of the architecture of the computer system of the present invention is illustrated. A processing component 101 is shown coupled to a system bus 104. In the preferred embodiment, processing component 101 is an 80386SL chip manufactured and distributed by the Assignee of the present invention. System bus 104 is an IBM PC-AT compatible bus in the preferred embodiment. Both the 80386SL and the AT bus are systems well known in the art.

A random access memory 140 is coupled to processing component 101 for storing data and instructions manipulated or executed by processing component 101. A memory controller within processing component 101 controls the operation of random access memory 140.

The computer system of the preferred embodiment shown in FIG. 1 also includes an I/O controller 103 coupled to bus 104. I/O controller 103 is an 82360SL I/O controller chip also manufactured and distributed by the Assignee of the present invention. I/O controller 103 accepts input/output commands from processing component 101 via bus 104 and produces the requested signals.

In the preferred embodiment, a memory card interface controller 102 is also coupled to system bus 104. Memory card interface controller 102 is an interface and controller into which a detachable flash memory card 112 may be inserted and thereby electrically coupled to the bus 104 and other devices coupled to bus 104. Detachable flash memory card 112 is one specific form of a class of external memory devices that may be used in embodiments of the present invention. Other alternative forms of external memory devices suitable for use with the present invention include a random access memory (RAM) card with a battery connected thereto to preserve memory contents, an erasable programmable read only memory (EPROM) card, or a test device with an interface that is directly connected to electrical contacts on a circuit board of the computer system. It will be apparent to those skilled in the art that these alternative external memory devices may be used in a manner equivalent to the use of the flash memory device of the preferred embodiment.

Particular memory locations on flash memory card 112 or other external memory device may be accessed by applying an address to memory card interface controller 102 via bus 104. A predetermined range of addresses are allocated to flash card 112 and the memory card interface controller 102 responds accordingly. The memory card interface controller 102 and flash card 112 operate as a paged extended memory system using a standard Personal Computer Memory Card Interface (PCMCIA). The PCMCIA interface allows the flash memory card 112 to be detached and removed from memory card interface controller 102. Flash memory card 112 is thus a detachable external memory means. Systems using the PCMCIA interface are well known to those of ordinary skill in the art.

In the preferred embodiment of the present invention, an extended bus 110 is also provided. Extended bus 110 is coupled to system bus 104 via transceiver component 105. A first system flash memory device 108 and a second system flash memory device 109 are both coupled to extended bus 110. First system flash memory device 108 (flash 1 memory) provides a first 128K bytes of system memory in the preferred embodiment. The second flash memory device 109 (flash 2 memory) provides a second 128K bytes of system memory. It will be apparent to those skilled in the art that other sizes of system memory may also be implemented using the techniques of the present invention. It will also be apparent to those skilled in the art that the present invention is also useful for a computer system employing a single system bus. For example, system memory 108 and system memory 109 may equivalently be coupled directly to system bus 104 if extended bus 110 was not used.

A chip select line 121 (CS0) is used to enable access to system memory 108. Similarly, chip select line 122 (CS1) is used to enable access to system memory 109. System memory devices 108 and 109 each have a distinct associated range of addresses (i.e. address space) corresponding to the memory locations located in each device. Unlike prior art systems using ROM devices, system memory 108 and 109 are not required to contain valid data or valid instructions on the initial power up of the computer system 10 shown in FIG. 1. In the preferred embodiment, system memory 108 and 109 are flash memory devices. Flash memory devices are well known to those of ordinary skill in the art.

Figure 2:
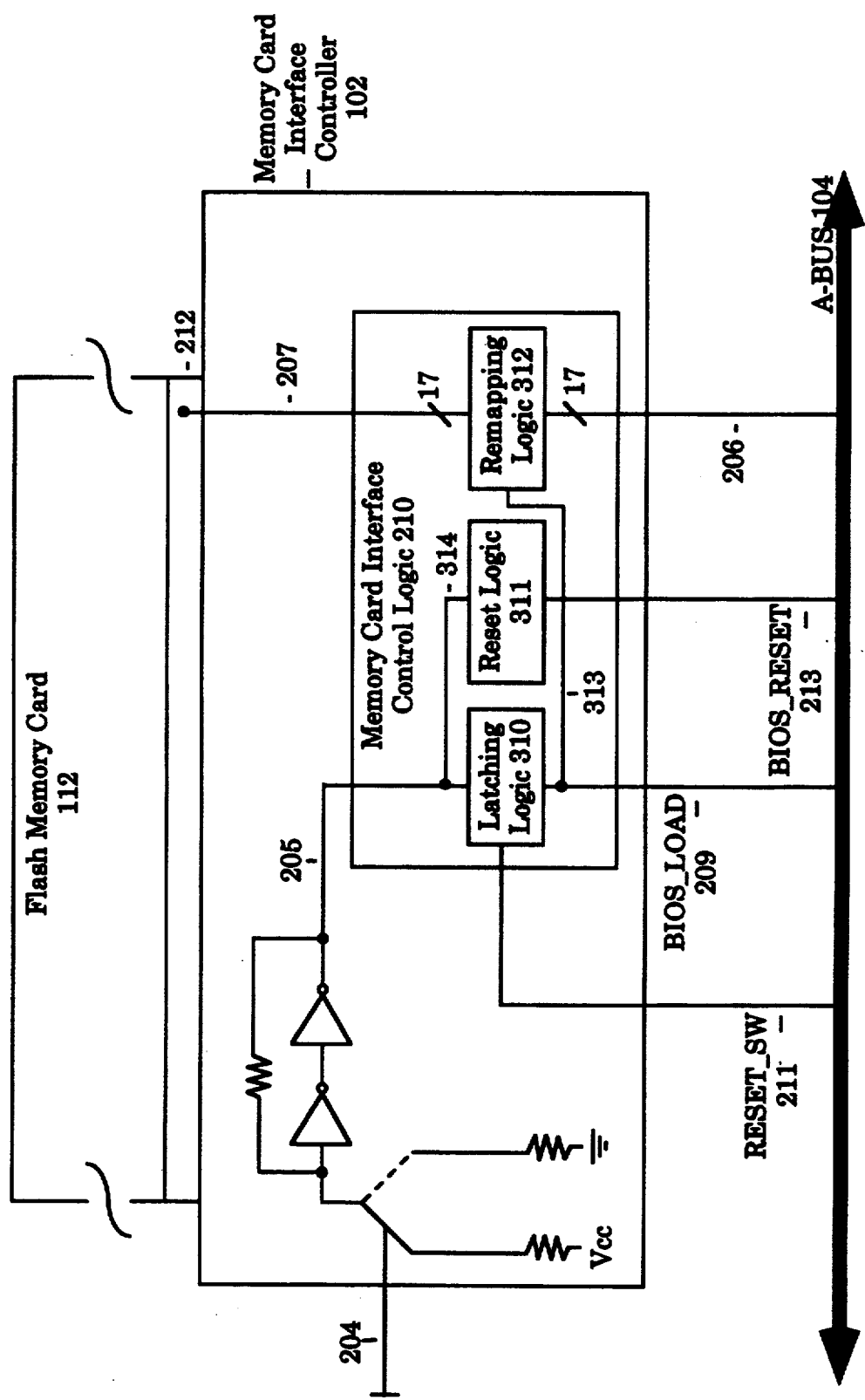
FIG. 2 is an illustration of the memory card interface controller.

Referring now to FIG. 2, a detailed diagram of the memory card interface controller 102 is depicted. A push button (momentary) switch 204 is provided for activating a signal on line 205 which is coupled to memory card interface control logic 210. An activated signal on line 205 indicates a user request to load the basic operating system software (BIOS) used for controlling the operation of the computer system 10 as shown in FIG. 1. The activation of momentary switch 204 is latched within memory card interface control logic 210 by latching logic 310. The latched signal from line 205 is provided as an output BIOS_LOAD signal on line 209. The BIOS_LOAD signal is used to activate the bootstrapping process for computer system 10 (of FIG. 1) as described below.

Line 205 is also tied to reset logic 311 via line 314. Reset logic 311 produces a momentary BIOS_RESET activation upon activation of switch 204. A momentary activation of the BIOS_RESET signal is provided as an output of memory card interface control logic 210 on line 213. The BIOS_RESET signal on line 213 is held active for a period long enough to signal a reset condition to processing component 101. A suitable active duration for a reset signal such as the BIOS_RESET signal on line 213 is well known to those of ordinary skill in the art.

An input signal (RESET_SW) to memory card interface control logic 210 is provided on signal line 211. The RESET_SW signal is provided on line 211 and used for resetting the latching logic 310 which holds the activated signal from line 205. Once this latching logic 310 is reset by the RESET_SW signal on line 211, the BIOS_LOAD signal on line 209 is deactivated. In an alternative embodiment, a control register inside memory card interface controller 102 may be used to deactivate the BIOS_LOAD signal. In this alternative, the BIOS_LOAD signal may be deactivated by writing to a control register in the memory card interface controller 102.

Memory card interface control logic 210 includes means for receiving an address from bus 104. In the normal mode of operation of computer system 10, addresses received from bus 104 are used to access corresponding locations in flash memory card 112 via interface 212. Means for controlling and accessing a flash memory card in this manner is well known in the art. Memory card interface control logic 210 includes address remapping logic 312 for remapping an address received from bus 104 over line 206 to a different address space of flash memory card 112 via line 207. In the preferred embodiment, the address remapping logic 312 is implemented using a custom gate array. This remapping logic operates between: 1) a normal operating mode where addresses presented on input line 206 are mapped to flash memory card 112 in accordance with the well known PCMCIA standard via line 207 and 2) a remapped mode where addresses presented on input line 206 are remapped to a different address space within flash memory card 112. The remapped state is activated by the BIOS_LOAD signal input received by remapping logic 312 on line 313. During the initial bootstrapping of computer system 10, addresses within flash memory card 112 are remapped to a different address space.

Referring again to FIG. 1, a keyboard controller 106 is also coupled to extended bus 110. Keyboard controller 106 manages input and output from an alphanumeric keyboard to which it is coupled. The alphanumeric keyboard is not shown in FIG. 1 so as not to obscure the present invention. By entering a specific set of keystrokes on the alphanumeric keyboard, a user may cause a restart (i.e. initialization or normal boot) of the computer system 10 shown in FIG. 1. In a typical IBM PC or compatible computer system, a Ctl-Alt-Del command sequence is used to restart the computer system. Such a means for restarting a computer system is well known to those of ordinary skill in the art. A keyboard flash memory 107 is coupled to keyboard controller 106 via line 137.

Figure 3:
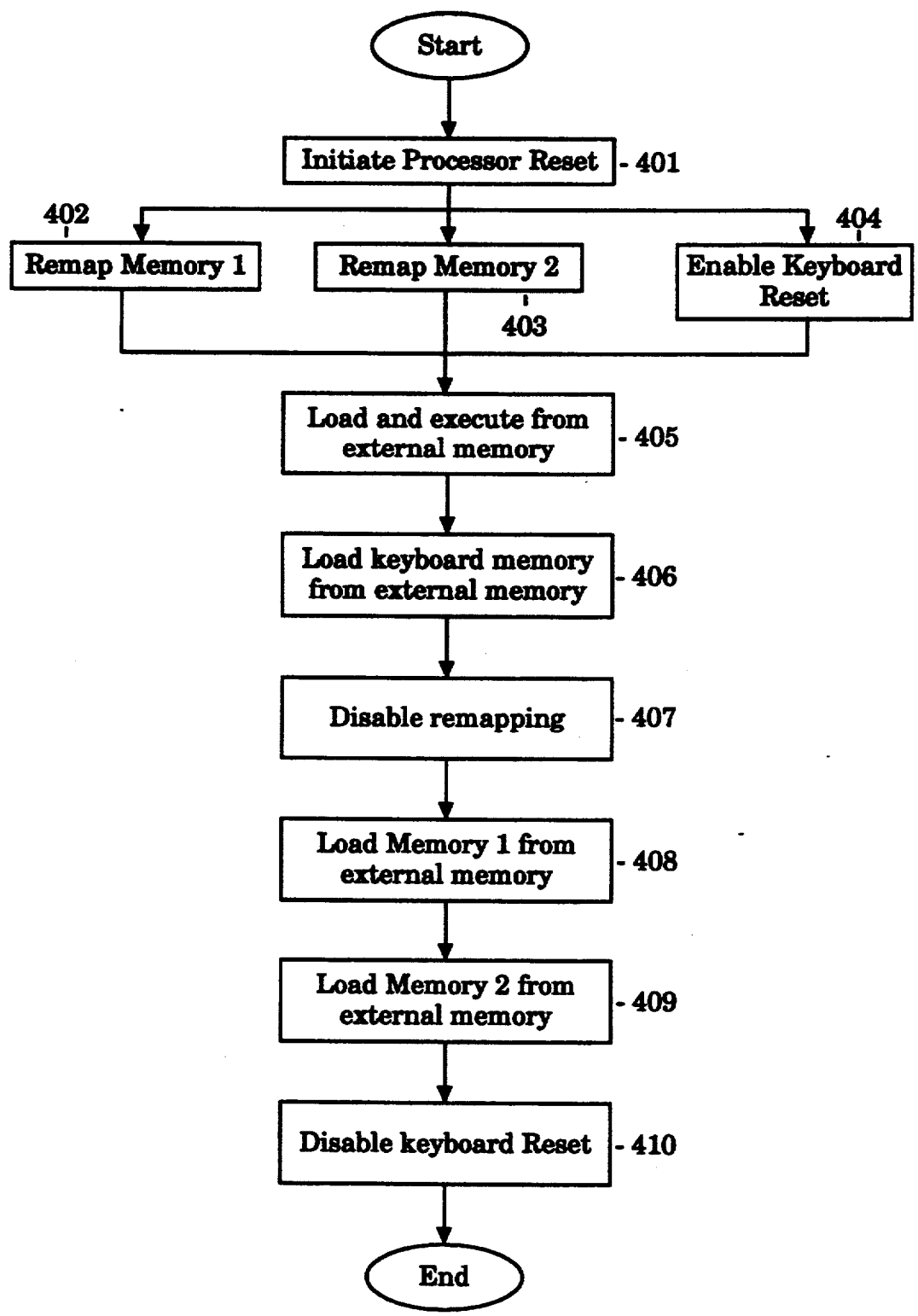
FIG. 3 is a flow chart of the method of the present invention.

Keyboard flash memory 107 is also coupled to extended bus 110 via keyboard interface control logic 118. Keyboard interface control logic 118 is coupled to extended bus 110 via line 119. Line 119 is used for transferring control, address, and data information to and from keyboard flash memory 107. Signal line 133, coupling keyboard interface control logic 118 to bus 104, is used for receiving the BIOS_LOAD signal from memory card interface controller 102. Keyboard interface control logic 118 includes latching logic 320 for holding an activated BIOS_LOAD signal received on line 133. The output of latching logic 320 on signal line 136, coupling keyboard interface control logic 118 and keyboard controller 106, is used during the bootstrapping process for holding keyboard controller 106 reset during the bootstrap loading of computer system 10. The BIOS_LOAD signal received on line 133 is also used by keyboard interface control logic 118 to trigger the remapping of the address space used by keyboard flash memory 107. Remapping logic 321 performs this remapping operation while an active BIOS_LOAD signal is presented on line 133. Signal line 134, coupling I/O controller 103 to system bus 104, is used for transmitting the RESET_SW signal to memory card interface controller 102. The activation of the RESET_SW signal on line 134 causes the deactivation of the BIOS_LOAD signal which in turn leads to the disabling of the remapping of the address space of both flash memory card 112 and keyboard flash memory 107. Signal line 135, coupling I/O controller 103 to keyboard interface control logic 118, is used for disabling the latching logic 320 which holds the keyboard controller 106 in a reset condition during the bootstrapping process. Through processing component 101, signal line 132 may be used to effectively couple chip select line 121 (CS0) to transceiver 105 depending on the mode of operation. Signal line 132 is used to disable access to extended bus 110 while the address space of external flash memory 112 is remapped during the bootstrapping process. The operation of the systems illustrated in FIGS. 1 and 2 during the bootstrapping process are described in the section below. Simultaneous reference is made to the flowchart of FIG. 3.

OPERATION OF THE PREFERRED EMBODIMENT

The computer system architecture of the present invention described above and illustrated in FIGS. 1 and 2 does not include a read only memory (ROM). Similarly, flash memory devices 107, 108, and 109 are not required to contain valid data or instructions on power up of computer system 10. The memory card interface controller 102 and the associated external flash memory card 112 are coupled to system bus 104 in order to provide a source for basic operating system software during the initialization or bootstrapping of computer system 10. External flash memory card 112 may thereafter be easily detached and removed from memory card interface controller 102.

Bootstrapping of computer system 10 is initiated by activation of the reset switch 204 coupled to memory card interface controller 102. It will be apparent to those skilled in the art that switch 204 may be physically installed in most any component of computer system 10 as long as the signal generated by switch 204 can be received by processing component 101, memory card interface controller 102, and keyboard interface control logic 118. It will also be apparent to those skilled in the art that switch 204 need not be a physical switch or push button but may be an external signal supplied as input to computer system 10 or a transmission received on a dedicated interface. In the preferred embodiment, switch 204 produces a momentary active signal on line 205. This momentary signal is received by memory card interface control logic 210 and stored in latching logic 310 therein. The activation of switch 204 causes a corresponding activation of the BIOS_LOAD signal on line 209 and the BIOS_RESET signal on line 213. The BIOS_LOAD signal remains active until reset by an activation of the RESET_SW signal on line 211. The BIOS_RESET signal on line 213 remains momentarily active for a predetermined duration.

Several events occur concurrently upon activation of the BIOS_LOAD signal. First, the BIOS_RESET signal on line 213 momentarily transitions to an active state thereby causing the reset of processing component 101. Secondly, the address remapping logic 312 within memory card interface control logic 210 is activated thereby causing a remapping of address signals received on line 206 to a different address space of flash memory card 112. Thirdly, address remapping logic 321 within keyboard interface control logic 118 is activated thereby causing the remapping of address signals received on line 119 to a different address space of keyboard flash memory 107. Fourth, a reset signal is applied and maintained on line 136 thereby holding keyboard controller 106 in a reset condition. Each of these four events as initiated by the activation of switch 204 are described in the sections below.

On activation of the BIOS_RESET signal on line 213, a system reset of processing component 101 occurs (step 401). On an initial program reset, the central processing unit (CPU) of processing component 101 is reset and initial program fetches are redirected to a particular memory address space (for example, physical address 01FFFFF0 in hex for the 80386SL). In prior art systems, this address space is stored in a ROM device which contains non-volatile system program storage. In the present invention, however, no ROM device is necessary in the computer system architecture. Similarly, the present invention does not require a permanently installed device that contains valid non-volatile operating system firmware useful for controlling the initial bootstrap loading of the computer system. Specifically, keyboard flash memory 107, system flash 1 memory 108, and system flash 2 memory 109 do not necessarily contain valid data or instructions. In a normal operating mode after bootstrap initialization is complete, system flash 1 memory 108 contains a first 128K bytes of system memory; system flash 2 memory 109 contains a second 128K bytes of system memory. The address space associated with the first 128K bytes of system memory in flash 1 memory 108 corresponds to the address space to which processing component 101 is directed on a system reset. During the bootstrapping process in the present invention, however, the address space associated with system flash 1 memory 108 is remapped to external flash memory card 112 (step 402). This remapping occurs by use of the remapping logic 312 within memory card interface control logic 210 as described earlier. When processing component 101 receives the BIOS_RESET signal from memory card interface controller 102, a system restart is initiated and control is initially directed to locations within external flash memory card 112 by virtue of the remapping of address signals by memory card interface control logic 210. Once processing component 101 is redirected by memory card interface control logic 210, data and instructions can be fetched and executed from external flash memory card 112 (step 405). The data and instructions residing on external flash memory card 112 drive the bootstrap initialization of processing component 101 and its associated system resources. A portion of the instructions on external flash memory card 112 are used for initializing a dynamic random access memory (DRAM) controller within processing component 101 for controlling random access memory 140 which is coupled to processing component 101. The use of a DRAM controller within a processing component such as processing component 101 is well known in the art. Once the DRAM controller within processing component 101 is initialized, data and instructions may be fetched from external flash memory card 112 and transferred along bus 104 to random access memory 140. In this way, random access memory (RAM) 140 may be loaded with data and instructions retrieved from external flash memory card 112.

Processing component 101 accesses computer system 10 resources by presenting an address associated with the desired resource on system bus 104. For example, in order to access system flash 1 memory 108, an address associated with the memory space of system flash 1 memory 108 is presented on bus 104 by processing component 101. In the preferred embodiment, the address space associated with system flash 1 memory 108 corresponds to a first 128K bytes of the system address space. If an address in this range is presented by processing component 101 on system bus 104, I/O con,roller 103 receives the address from bus 104 and enables chip select line 121 thereby enabling access to system flash 1 memory 108. Data may then be transferred between processing component 101 and system flash 1 memory 108 via line 113, transceiver 105, line 114, extended bus 110, and line 116. During the bootstrapping process, however, memory card interface control logic 210 responds to addresses presented on system bus 104 that correspond to addresses associated with system flash 1 memory 108.

In order to suppress activation of system flash 1 memory 108 while external flash memory card 112 is being read during the bootstrapping process, I/O controller 103 emits a signal along line 132 to disable operation of transceiver 105 while chip select line (CS0) 121 is active during a memory read cycle, as shown in FIG. 1. Line 132 carries a signal that disables operation of transceiver 105 while chip select line (CS0) 121 is active during a memory read cycle. Thus, during a memory read cycle while chip select line 121 is active, transceiver 105 is disabled thereby preventing the transfer of data between processing component 101 and system flash 1 memory 108 and enabling the transfer of information between processing component 101 and external flash memory card 112. Transceiver 105 remains disabled as long as data and/or instructions are being fetched from external flash memory card 112 during the bootstrapping process. Conversely, when normal operations are resumed, the disable signal is removed from line 132 by controller 103.

The BIOS LOAD signal generated by memory card interface control logic 210 and output via line 209 is received by keyboard interface control logic 118 via line 133. The BIOS_LOAD signal received by keyboard interface control logic 118 on line 133 is latched by latching logic 320. The output of latching logic 320 on line 136 is coupled to keyboard controller 106. When the BIOS_LOAD signal transitions to an active state during the bootstrapping process, the active signal output to keyboard controller 106 on line 136 is used to hold keyboard controller 106 in a high impedance and reset state during the bootstrap loading process (step 404). Holding keyboard controller 106 reset in this manner prevents a computer system operator from initiating a system restart using a command sequence entered on an alphanumeric keyboard coupled to keyboard controller 106.

The active BIOS_LOAD signal on line 133 is also provided to keyboard flash memory remapping logic 321 in order to enable remapping of the keyboard flash memory 107 address space during the bootstrap loading process. Remapping logic 321 when enabled by the BIOS_LOAD signal causes address signals input on line 119 to be remapped to the address space normally associated with system flash 2 memory 109 (step 403). In the preferred embodiment, this address space corresponds to the second 128K bytes of the system BIOS space. When remapping logic 321 is disabled on the deactivation of BIOS_LOAD) on line 133, the address space associated with keyboard flash memory 107 returns to an addressing region distinct from system flash 2 memory 109. In the preferred embodiment, the addressing region associated with keyboard flash memory 107 returns to its normal operating state where flash memory 107 address space is accessible only by keyboard controller 106.

When the BIOS_LOAD signal is active and keyboard flash memory 107 is remapped to the second 128K bytes of system BIOS memory, the contents of keyboard flash memory 107 may be erased, loaded with valid data and/or instructions, and read back in order to verify the loaded contents (step 406). This erase, load, and verify operation on keyboard flash memory 107 is performed by processing component 101 as it executes instructions in external flash memory card 112 or random access memory 140. Keyboard flash memory 107 can thus be properly initialized during bootstrap loading. Access to flash 2 memory 109 is suppressed by deactivation of chip select line (CS1) 122 by I/O controller 103 when keyboard flash memory 107 is being accessed during bootstrap mode.

Once processing component 101 has initialized its DRAM controller, loaded and verified random access memory 140, and loaded and verified keyboard flash memory 107, the remapping of address signals enabled in memory card interface control logic 210 and keyboard interface control logic 118 is no longer necessary. For that reason processing component 101 issues a command to I/O controller 103 that resets the BIOS_LOAD signal which in turn disables the remapping logic 312 in memory card interface control logic 210 and the remapping logic 321 in keyboard interface control logic 118 (step 407). I/O controller 103 resets the BIOS_LOAD signal by producing an activation of the RESET_SW signal on line 134 as illustrated in FIG. 1 and line 211 as illustrated in FIG. 2. The RESET_SW signal causes a reset of the latching logic 310 holding the active BIOS_LOAD signal. The active RESET_SW signal serves to reset this latching logic 310 thereby deactivating the BIOS_LOAD signal. In an alternative embodiment, a control register inside memory card interface controller 102 may be used to deactivate the BIOS_LOAD signal. In this alternative, the BIOS_LOAD signal may be deactivated by writing to a control register in the memory card interface controller 102.

Upon deactivation of the BIOS_LOAD signal, the remapping logic 312 in memory card interface control logic 210 is correspondingly disabled thereby suppressing the remapping of system flash 1 memory 108 space to external flash memory card 112. Similarly, the deactivation of the BIOS_LOAD signal disables the address remapping logic 321 in keyboard interface control logic 118 thereby disabling the remapping of system flash 2 memory 109 address space to keyboard flash memory 107. Even though the BIOS_LOAD) signal has now been deactivated, latching logic 320 maintains an active high reset signal to keyboard controller 106.

Having restored address mapping to a normal (not remapped) configuration, the memory address space associated with system flash 1 memory 108 now corresponds to the first 128K of system memory BIOS address space and the memory address space associated with system flash 2 memory 109 corresponds to the second 128K of the system memory address space. As processing component 101 is now executing instructions resident in random access memory 140, memory card interface controller 102 may now be accessed for normal retrieval of data and instructions for storage in system flash 1 memory 108 and system flash 2 memory 109. In the preferred embodiment, system flash 1 memory 108 and system flash 2 memory 109 are initially erased by processing component 101 using a well known set of signals and instructions. Processing component 101 then accesses external flash memory card 112 in order to retrieve normal operating system software (BIOS) which is then transferred into system flash 1 memory 108 and system flash 2 memory 109 (step 408, 409). A verification procedure is then executed to verify that system flash 1 memory 108 and system flash 2 memory 109 contain valid data and/or instructions.

At this point, system flash 1 memory 108, system flash 2 memory 109, and keyboard flash memory 107 have all been loaded with valid information and the contents of same verified. The only remaining step to complete the bootstrapping process is the removal of the active high reset signal to keyboard controller 106 (step 410). In order to perform this step, processing component 101 issues a command to I/O controller 103 to produce an active signal on line 135 which is coupled to keyboard interface control logic 118. The active signal on line 135 serves to reset the latching logic 320 holding the high reset signal which is present on line 136. Once the latching logic 320 is reset, the active high reset signal to keyboard controller 106 is removed and keyboard controller 106 may thereafter resume normal mode operation.

Thus, a computer system is disclosed wherein a processor is bootstrap loaded from an external memory device instead of being bootstrap loaded from on-board read only memory.

Although the invention has been described herein with reference to a specific embodiment, many modifications and variations therein will readily occur to those skilled in the art. Accordingly, all such variations and modifications are included within the intended scope of the present invention as defined by the following claims.

We claim:

1. In a computer system having a system bus, a processing component, and a removable external memory device coupled to said system bus, said removable external memory device having a first address space and a second address space, a process for bootstrapping said computer system comprising the steps of:
   initiating a reset of said computer system by driving a reset signal;
   latching said reset signal in a latching logic, said latching logic activating an operating system load signal after said reset signal has been activated;
   disabling a reset of said computer system from a keyboard controller when said operating system load signal is active;
   remapping said removable external memory device in response to said operating system load signal such that said processing component will execute operating system instructions within said second address space in said removable external memory device upon reset of said processing component;
   resetting said processing component;
   executing said operating system instructions located in said second address space of said external memory device; and
   deactivating said operating system load signal when said processing component is finished executing said operating system instructions such that said accesses to said removable external memory device are mapped back into said first address space of said removable external memory device; and
   enabling said reset of said computer system from said keyboard controller when said operating system load signal is deactivated.

2. The process as claimed in claim 1 further comprising the steps of:
   loading a random access memory with data and instructions from said second address space of said removable external memory device, said random access memory coupled to said processing component.

3. The process as claimed in claim 1 further including the steps of:
   erasing the contents of a first system memory, said first system memory coupled to said system bus;
   loading said first system memory from said external memory device; and
   verifying the contents of said first system memory.

4. The process as claimed in claim 1 further comprising the steps of:
   erasing contents of a first system memory, said first system memory coupled to said system bus;
   loading said first system memory with data and instructions from said second address space of said removable external memory device; and
   verifying the contents of said first system memory.

5. The process as claimed in claim 4 further comprising the step of:
   disabling access to said first system memory while said processing component is executing instructions retrieved from said second address space of said removable external memory device.

6. In a computer system having a system bus, a processing component, and a removable external memory device coupled to said system bus, said removable external memory device having a first address space and a second address space, a process for bootstrapping said computer system comprising the steps of:
   initiating a reset of said computer system by driving a reset signal;
   latching said reset signal in a latching logic, said latching logic activating an operating system load signal after said reset signal has been activated;
   disabling a reset from keyboard Signal when said operating system load signal is activated;
   remapping said removable external memory device in response to said operating system load signal such that said processing component will execute operating system instructions within said second address space of said removable external memory device upon reset of said processing component;
   resetting said processing component;
   executing instructions located in said second address space of said removable external memory device;
   erasing contents of a second system memory, said second system memory coupled to said processing component;
   loading said second system memory with data and instructions from said second address space of said removable external memory device;
   verifying the contents of said second system memory;
   erasing contents of a keyboard memory, said keyboard memory coupled to said processing component and a keyboard controller;
   loading said keyboard memory with data and instructions from said second address space of said removable external memory device;
   verifying the contents of said keyboard memory;
   deactivating said operating system load signal when said processing component is finished executing said operating system instructions; and
   enabling said reset from keyboard signal when said operating system load signal is deactivated.

7. The process as claimed in claim 6 further comprising the steps of:
   disabling a reset of said computer system from a keyboard controller while said computer system is being bootstrap loaded; and
   enabling a reset of said computer system from said keyboard controller while said computer system is operating in a normal mode.

8. A computer system that boots from an external memory, said computer system comprising:
   a system bus for transferring data and control information;
   a processing component for executing processing logic, said processing component coupled to said system bus;
   reset circuitry for initiating a reset signal in said computer system;
   a keyboard controller coupled to said system bus, said keyboard controller capable of initiating said reset signal that resets said computer system;

an external memory controller, said external memory controller coupled to said system bus, said external memory controller comprising:

an external memory interface for receiving removable external memory devices;

latching logic, said latching logic latching said reset signal, said latching logic activating an operating system load signal when said reset signal is activated;

reset logic coupled to said reset signal, said reset logic generating a momentary system reset signal on said system bus when said reset signal is activated, said system reset signal resetting said processing component;

a set of incoming address lines for receiving a memory address;

remapping logic, said remapping logic remapping said memory address from a first address space to a second address space when said operating system load signal is activated;

a removable external memory device coupled to said external memory interface, said removable external memory device having operating system processing logic stored in said second address space; and means for deactivating said operating system load signal such that said remapping logic no longer remaps said memory address from said first address space to said second address space;

means for disabling keyboard controller from initiating said reset signal when said operating system load signal is active; and means for enabling said keyboard controller such that said keyboard controller is capable of initiating said reset signal when said operating system load signal is active deactivated;

such that said computer system boots from said removable external memory device.

9. The computer system as claimed in claim 8 further comprising:

a random access memory coupled to said processing component; and means for loading said random access memory with said operating system processing logic from said removable external memory device.

10. The computer system as claimed in claim 8 wherein said removable external memory device comprises a flash memory device.

11. The computer system as claimed in claim 8 wherein said external memory device comprises a flash memory device.

12. The computer system as claimed in claim 8 further comprising:

a first system memory coupled to said system bus;

means for erasing said first system memory;

means for loading said first system memory with said operating system processing logic stored in said second address space of said removable external memory device; and means for verifying said first system memory.

13. The computer system as claimed in claim 12 further comprising:

means for disabling access to said first system memory while said processing component is executing said operating system processing logic retrieved from said second address space of said removable external memory device.

14. The computer system as claimed in claim 12 further comprising:

second system memory coupled to said system bus;

means for erasing contents of said second system memory;

means for loading said second system memory with said operating system processing logic from said second address space of said external memory device; and means for verifying the contents of said second system memory.

15. The computer system as claimed in claim 14 wherein said second system memory is a flash memory device.

16. The computer system as claimed in claim 14 further comprising:

keyboard memory coupled to said system bus and said keyboard controller;

means for erasing said keyboard memory;

means for loading said keyboard memory with said operating system processing logic from said second address space of said removable external memory device; and means for verifying said operating system processing logic loaded into said said keyboard memory.

17. The computer system as claimed in claim 16 wherein said keyboard memory is a flash memory device.

* * * * *

UNITED STATES PATENT AND TRADEMARK OFFICE
CERTIFICATE OF CORRECTION

PATENT NO. : 5,410,707
DATED : April 25, 1995
INVENTOR(S) : D. Michael Bell It is certified that error appears in the above-identified patent and that said Letters Patent is hereby corrected as shown below:

In column 1 at line 61 delete "an" and insert --art--

In column 3 at line 53 delete "he" and insert --the--

In column 8 at line 49 delete "con,roller" and insert --controller--

Signed and Sealed this

Fifteenth Day of July, 1997

*Attest:*

BRUCE LEHMAN

*Attesting Officer*       *Commissioner of Patents and Trademarks*